United States Patent
Gao et al.

(10) Patent No.: US 8,582,329 B2
(45) Date of Patent: Nov. 12, 2013

(54) ADAPTIVELY CONTROLLED SOFT START-UP SCHEME FOR SWITCHING POWER CONVERTERS

(75) Inventors: Xiaolin Gao, Santa Clara, CA (US); Yong Li, San Jose, CA (US); Hien Huu Bui, San Jose, CA (US); Fuqiang Shi, Cupertino, CA (US)

(73) Assignee: iWatt Inc., Campbell, CA (US)

( * ) Notice: Subject to any disclaimer, the term of this patent is extended or adjusted under 35 U.S.C. 154(b) by 210 days.

(21) Appl. No.: 13/076,157

(22) Filed: Mar. 30, 2011

(65) Prior Publication Data

US 2012/0176819 A1    Jul. 12, 2012

Related U.S. Application Data

(60) Provisional application No. 61/431,283, filed on Jan. 10, 2011.

(51) Int. Cl.
    *H02M 3/335*    (2006.01)
(52) U.S. Cl.
    USPC .................. 363/21.16; 363/21.18; 363/97
(58) Field of Classification Search
    USPC ........... 363/21.16, 21.08, 21.09, 21.1, 21.11, 363/21.12, 21.17, 21.18, 97
    See application file for complete search history.

(56) References Cited

U.S. PATENT DOCUMENTS

| | | | |
|---|---|---|---|
| 4,967,051 A * | 10/1990 | Maehara et al. | 219/721 |
| 5,552,694 A * | 9/1996 | Appeltans | 323/222 |
| 5,757,626 A * | 5/1998 | Jovanovic et al. | 363/21.04 |
| 6,944,034 B1 * | 9/2005 | Shteynberg et al. | 363/21.13 |
| 7,310,251 B2 * | 12/2007 | Yang et al. | 363/56.09 |
| 7,539,028 B2 * | 5/2009 | Baurle et al. | 363/19 |
| 7,545,126 B2 * | 6/2009 | Su et al. | 323/273 |
| 7,592,790 B2 * | 9/2009 | Yang | 323/277 |
| 2009/0268362 A1 * | 10/2009 | Wang et al. | 361/91.1 |
| 2010/0157636 A1 | 6/2010 | Li et al. | |
| 2011/0148379 A1 * | 6/2011 | Gu et al. | 323/284 |
| 2011/0228571 A1 * | 9/2011 | Lin et al. | 363/21.16 |
| 2012/0014142 A1 * | 1/2012 | Tsai et al. | 363/21.17 |

FOREIGN PATENT DOCUMENTS

KR    1991-0006174    8/1991

OTHER PUBLICATIONS

Korean Intellectual Property Office, Grounds for Rejection, Korean Patent Application No. 10-2012-0002994, May 14, 2013, ten pages.

* cited by examiner

*Primary Examiner* — Gary L Laxton
*Assistant Examiner* — Kyle J Moody
(74) *Attorney, Agent, or Firm* — Fenwick & West LLP (57) ABSTRACT

A switching power converter provides regulated voltage to a load according to a desired regulation voltage. The switching power converter includes a transformer coupled to a switch and a switch controller for generating a control signal to control switching. The switch controller monitors a sensed voltage representing the output voltage of the switching power converter. The switch controller controls switching of the switch to operate the switching power converter in a continuous conduction mode while the sensed output voltage indicates that the output voltage is less than a first threshold voltage. The switch controller controls switching of the switch to operate the switching power converter in a discontinuous conduction mode while the sensed output voltage is above the first threshold voltage.

18 Claims, 6 Drawing Sheets

ADAPTIVELY CONTROLLED SOFT START-UP SCHEME FOR SWITCHING POWER CONVERTERS

CROSS-REFERENCE TO RELATED APPLICATION

This application claims priority under 35 U.S.C. §119(e) from U.S. Provisional Patent Application No. 61/431,283, entitled "Adaptively Controlled Soft Start-Up Scheme For Switching Power Converters" filed on Jan. 10, 2011, which is incorporated by reference herein in its entirety.

BACKGROUND OF THE INVENTION

1. Field of the Invention

The present invention relates generally to a power converter, and more specifically, to a power converter having a switch controller controlling the switching cycles at start-up and/or power on reset (POR).

2. Description of the Related Art

Power converters typically require error circuitry that provides an "error" signal between the output voltage of the power converter and a reference voltage, in order to regulate the output voltage. The error circuitry should provide a magnitude and a sign (positive or negative) of the output voltage relative to a reference voltage. The power converter can use the error signal to properly regulate the output voltage by increasing or decreasing the amount of power delivered to the output of the power converter in response to the error signal.

Conventional power converters typically generate an error signal by sensing the output voltage as an analog value, deriving the difference between the sensed output voltage and the reference voltage as an analog value and amplifying it. Conventional power converters may also use an analog-to-digital converter (A/D converter) to generate the error signal depending upon the control scheme. Other conventional power converters may use analog error amplifiers to generate the error signal.

In many conventional isolated switching power converters, the output voltage is directly sensed on the secondary side of a transformer and compared to a reference voltage fixed so that the output voltage of the power converter is regulated to a target level. Alternatively, other conventional isolated switching power converters do not sense the output voltage directly, and instead sense a voltage on the primary side of the transformer. The sensed primary-side voltage is compared to a reference voltage fixed so that the output voltage of the power converter is regulated to a target level. These isolated switching power converters are commonly referred to as primary-only feedback converters.

In the case of primary-only feedback converters, there may be situations where during certain switching cycles, the output voltage may differ dramatically from the regulated target voltage as set by the reference voltage. One example of this occurrence is during the initial start-up of the switching power converter. The initial start-up phase is especially difficult for primary-only feedback converters because they do not directly sense the output voltage. When the output voltage differs dramatically from the regulated target voltage during start-up, the sensed primary side voltage provides an inaccurate representation of the output voltage. As a result, conventional primary-only feedback converters may be slow to reach the regulated target voltage after start-up. The problem may worsen when the secondary output stage of a primary-only switching converter is coupled to an output filter stage that includes high capacitance electrolytic capacitors, thus further slowing the startup cycle. If the controller of the primary-only switching power converter fails to raise the output voltage in a controlled manner from 0 VDC to the regulated output voltage level within a maximum amount of time, damage may be caused to any electronic device(s) connected to the power converter.

Another major function of the controller is to sense and detect abnormal and/or fault conditions, and to provide a safe operating mode for the switching converter until the fault condition is removed. At the start-up mode, the output voltage, typically starting at 0 VDC, is significantly lower than the desired regulated output voltage level. The capacitive load based on the output filter capacitors also impacts the rise time of the output voltage. The condition of the output voltage being significantly lower than the desired regulated output voltage level can also be observed in a fault condition where there is a short circuit of the output of the switching converter. As a result, conventional primary-only switching converters are susceptible to false fault detection. This may prevent the switching converter from start-up even when a fault condition does not exist.

One conventional solution to the above described problems is to configure the controller to deliver the maximum amount of energy to the secondary until the output reaching the regulation point is detected. However, this conventional solution is still problematic because it may cause output voltage overshoot, and subsequent output voltage ringing.

SUMMARY OF THE INVENTION

A switching power converter provides regulated voltage to a load according to a desired regulation voltage. A transformer includes a primary winding coupled to an input and a secondary winding coupled to an output of the switching power converter. A switch is coupled to the primary winding of the transformer. Current through the primary winding is generated while the switch is turned on and is not generated while the switch is turned off. A switch controller generates a control signal to turn on or turn off the switch. The switch turns on responsive to the control signal being in a first state and the switch turns off responsive to the control signal being a second state. The switch controller monitors a sensed voltage representing the output voltage of the switching power converter. The switch controller controls switching of the switch to operate the switching power converter in a continuous conduction mode while the sensed output voltage indicates that the output voltage is less than a first threshold voltage. The switch controller controls switching of the switch to operate the switching power converter in a discontinuous conduction mode while the sensed output voltage is above the first threshold voltage. In one embodiment, the first threshold voltage is in the range of 10-25% of the desired regulation voltage at the output of the switching power converter.

In one embodiment, the switch controller controls switching of the switch to operate the switching power converter in an open loop discontinuous conduction mode while the sensed voltage indicates that the output voltage is above the first threshold voltage and below a second threshold voltage. The switch controller controls switching of the switch to operate the switching power converter in a closed loop discontinuous conduction mode while the sensed voltage indicates that the output voltage is above the second threshold voltage. In one embodiment, the second threshold voltage is in the range of 60-80% of the desired regulation voltage.

In one embodiment, the switch controller detects a fault condition based on the rise time of the sensed output voltage during the continuous conduction mode and places the switching converter in a safe mode responsive to a fault condition being detected.

By operating in CCM at initial startup when the output voltage is substantially below the desired regulation voltage, the switching power converter transfers maximum energy to the secondary stage, allowing for the rapid rise of the output voltage. By switching to open loop discontinuous conduction mode after the output voltage reaches the first threshold voltage, the switching power converter can begin accurately monitoring the output voltage while still allowing the output voltage to increase as rapidly as possible in discontinuous conduction operation. Finally, by switching to closed loop discontinuous conduction mode after the output voltage reaches the second threshold voltage, the switching power converter can slow the rise of the output voltage as it nears the desired regulation voltage in order to minimize overshoot and ringing.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

An embodiment of the present invention comprises a switching power converter providing adaptive primary-only control of switching cycles. At start-up conditions, when the output voltage is significantly lower than the desired regulation point, the primary-only control provides for the orderly rise (minimal overshoot and ringing) of the output voltage level while maintaining protection for fault conditions and avoiding false fault conditions. The adaptive control allows for the proper start-up procedure over a wide range of output capacitance that is coupled to the secondary output.

Figure 1:
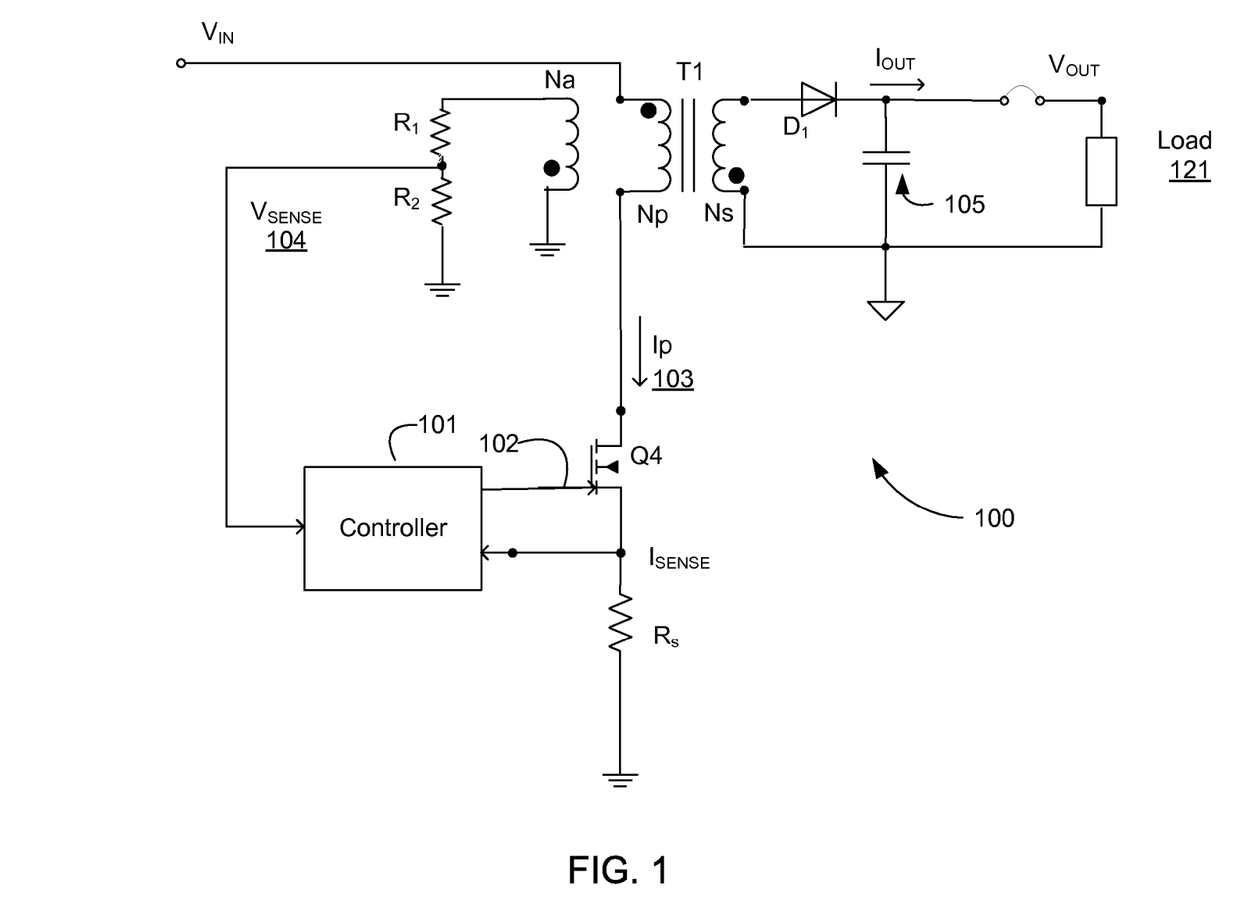
FIG. 1 is a diagram illustrating a switching power converter according to one embodiment of the present invention.

FIG. 1 is a diagram illustrating a power converter 100 according to an embodiment of the present invention. The switching power converter includes, among other components, a transformer T1, a switch Q4, an output rectifier diode D1, output filter capacitor 105, and a switch controller 101.

Input voltage $V_{IN}$, typically rectified AC voltage, is input to switching power converter 100. Switch controller 101 controls the ON state and the OFF state of switch Q4 using pulse signal 102 generated by switch controller 101 in the form of a pulse with on-times ($T_{ON}$) and off-times ($T_{OFF}$). Pulse signal 102 may be a periodic pulse with a fixed period, or a pulse with its period varying as necessary. When switch Q4 is turned on because pulse signal 102 is high during the on-time, energy is stored in the primary side windings Np of transformer T1 because diode D1 is reverse biased. When switch Q4 is turned off, the energy stored in the primary windings Np of transformer T1 is released to the secondary side Ns of transformer T1 because diode D1 becomes forward biased. Diode D1 rectifies the output voltage on the secondary windings Ns of transformer T1 and capacitor 105 filters the output voltage on the secondary windings of transformer T1 for outputting as output voltage $V_{OUT}$.

Resistors R1 and R2 form a voltage divider coupled in series with auxiliary winding Na of transformer T1, and produce sensed voltage $V_{SENSE}$, which is representative of output voltage $V_{OUT}$. In general operation, controller 101 monitors $V_{SENSE}$ and controls switching to maintain $V_{OUT}$ substantially near a desired regulation voltage $V_{REG}$ (for example, within an allowable error range). $I_P$ is the primary side current through switch Q4 and source resistor $R_S$. $I_{OUT}$ is the output current through load 121. In one embodiment, load 121 comprises a high capacitance load (e.g., in the range of 4000-8000 µF) as may be found, for example, in a network adapter or other similar applications.

For a primary-only switching power converter, a desired waveform to utilize as $V_{SENSE}$ is the reflected waveform across power switch Q4, and, more specifically, at the point in the switching cycle at or near the moment when the energy stored in transformer T1 has been fully delivered to the output stage (diode D1 current drops to zero). This point is referred to as the "knee voltage" (V-Knee) where the secondary losses are minimal. At start-up or power-on-reset (POR), output voltage $V_{OUT}$ is significantly lower than desired regulation voltage $V_{REG}$ and the knee voltage does not provide a reliable representation of $V_{OUT}$. It is therefore desirable to build up output voltage $V_{OUT}$ quickly, making the knee voltage a reliable feedback source.

Figure 2:
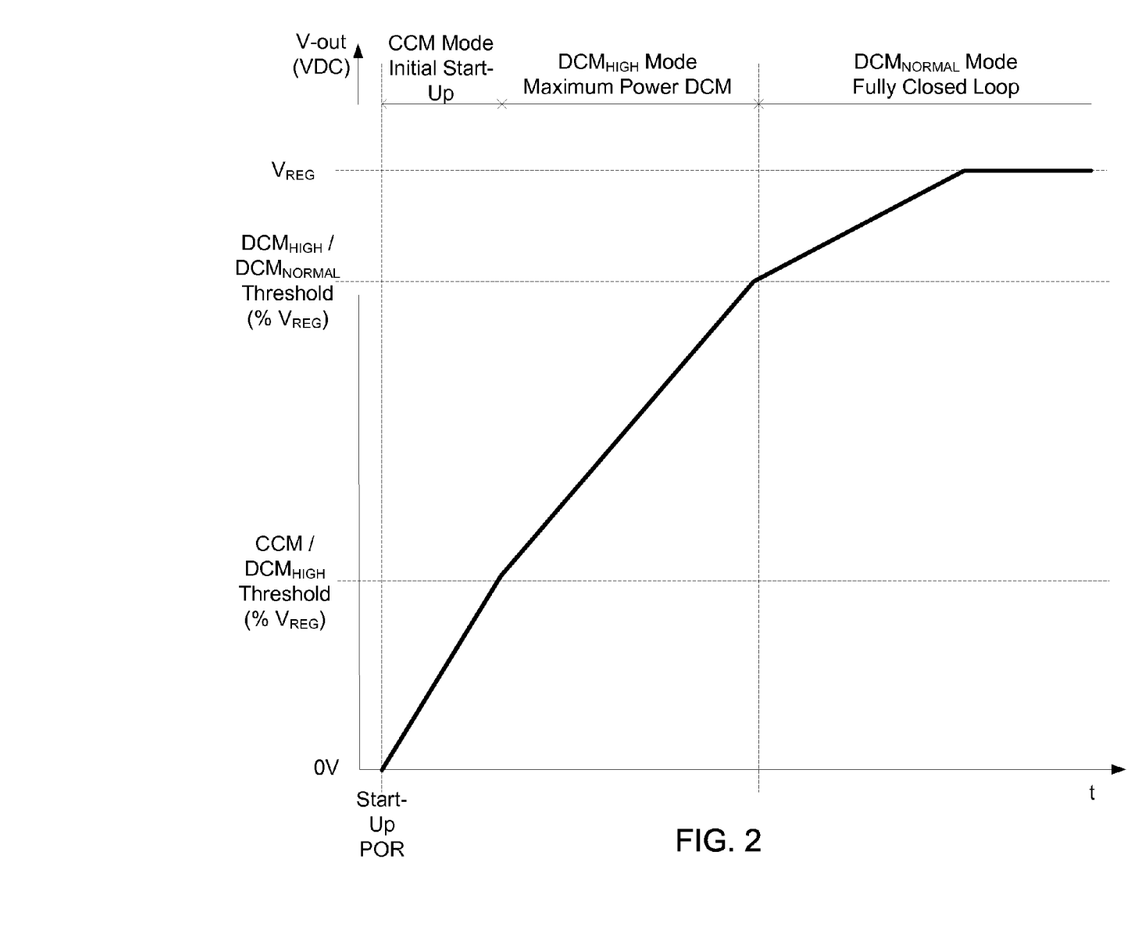
FIG. 2 illustrates the waveform of $V_{OUT}$ of during a normal start-up sequence of the switching power converter according to one embodiment of the present invention.

FIG. 2 illustrates the waveform of $V_{OUT}$ over time t during a start-up sequence of switching power converter 100 at power on reset (POR). In the illustrated embodiment, switching power converter 100 operates in three main modes of operation: Continuous Conduction Mode (CCM), High Power Discontinuous Conduction Mode ($DCM_{HIGH}$) (also referred to herein as open loop DCM), and Normal Discontinuous Conduction Mode ($DCM_{NORMAL}$) (also referred to herein as closed loop DCM). As used herein, DCM may generally refer to either $DCM_{HIGH}$ or $DCM_{NORMAL}$.

In CCM, controller 101 places switch Q4 in the on state prior to all of the energy stored in power transformer T1 being delivered to the secondary stage. As a result, the magnetizing current in power transformer T1 never goes to zero. Once switch Q4 is turned on, diode D1 is immediately reverse biased and stops conducting current. Thus, switch Q4 starts to conduct current without waiting for the current in diode D1 to decrease to zero during off-times ($T_{OFF}$). The average output current $I_{OUT}$ flowing to load 121 is the filtered low-frequency component of the current in diode D1. Generally, the average output current is greater in CCM than in $DCM_{HIGH}$ or $DCM_{NORMAL}$, and output voltage $V_{OUT}$ will rise more rapidly. A side-effect of operating in CCM, however, is that sensed voltage $V_{SENSE}$ does not provide as accurate representation of output voltage $V_{OUT}$ as it does in $DCM_{HIGH}$ or $DCM_{NORMAL}$. Thus, for primary-feedback-only switching power converters, it is generally undesirable to operate converter 100 in CCM during regular operation (after startup) when a stable and precisely regulated output voltage $V_{OUT}$ is desired.

In $DCM_{HIGH}$ and $DCM_{NORMAL}$, controller 101 controls switching of switch Q4 such that the magnetizing current stored in transformer T1 drops to zero between switching cycles, and the current flowing through diode D1 has completely dropped to zero before switch Q4 is turned on. As a result, average output current is lower in $DCM_{HIGH}$ and $DCM_{NORMAL}$ than in CCM, and output voltage $V_{OUT}$ will rise slower during startup. Unlike CCM, however, sensed voltage $V_{SENSE}$ can provide a substantially accurate representation of output voltage $V_{OUT}$ in $DCM_{HIGH}$ and $DCM_{NORMAL}$. Specifically, in $DCM_{HIGH}$ and $DCM_{NORMAL}$, the knee voltage can be used to accurately control switching power converter 100 and reliably discriminate between normal operation and any fault condition that may be present. In general operation (after start up), there are many advantages of operating switching power converter 100 in a DCM, including implementing zero voltage switching and using the knee voltage for achieving precise primary-only regulation of $V_{OUT}$.

$DCM_{HIGH}$ and $DCM_{NORMAL}$ differ in that $DCM_{HIGH}$ operates in an "open loop" configuration while $DCM_{NORMAL}$ operates in a "closed loop" configuration. In the closed loop configuration ($DCM_{NORMAL}$), controller 101 monitors $V_{SENSE}$ and controls switching frequency and primary peak current $I_P$ through Q4 to maintain $V_{OUT}$ at a regulated level. In the open loop configuration ($DCM_{HIGH}$), controller 101 provides the same control output regardless of $V_{SENSE}$. In one embodiment, for example, controller 101 sets the switching frequency and primary peak current $I_P$ at predefined maximum allowable levels to deliver maximum energy to the secondary output. In other words, while in $DCM_{HIGH}$, switch controller 101 can allow for the maximum discontinuous conduction mode energy to be delivered to the secondary side while still accurately monitoring the level of $V_{OUT}$ via V-Knee. As a result, $DCM_{HIGH}$ generally provides a faster rise time than $DCM_{NORMAL}$. However, operating in $DCM_{NORMAL}$ will generally lead to lower voltage overshoot and ringing.

In one embodiment, switch controller 101 operates in CCM at initial startup when the output voltage is substantially below desired regulation voltage $V_{REG}$. This allows for the most rapid rise of $V_{OUT}$. Switch controller 101 monitors $V_{SENSE}$ and switches to $DCM_{HIGH}$ when $V_{SENSE}$ indicates that $V_{OUT}$ has risen above a first threshold voltage. Although $V_{SENSE}$ does not provide a precise representation of $V_{OUT}$ in CCM, it is sufficient for the purpose of determining when to switch to $DCM_{HIGH}$ because the first threshold is generally set substantially below the regulation voltage $V_{REG}$. Once in $DCM_{HIGH}$, the knee voltage becomes a reliable feedback signal source. Switch controller 101 continues to monitor $V_{SENSE}$ and when $V_{SENSE}$ indicates that $V_{OUT}$ has risen above a second threshold voltage, switch controller 101 switches to $DCM_{NORMAL}$.

In one embodiment, the threshold voltages can be determined based on a percentage of regulation voltage $V_{REG}$. For example, the first threshold voltage for switching from CCM to $DCM_{HIGH}$ could be set to a value between 10% and 25% (e.g., around 15%) of $V_{REG}$, and the second threshold for switching from $DCM_{HIGH}$ to $DCM_{NORMAL}$ could be set to a value between 60% and 80% (e.g., around 70%) of $V_{REG}$. Other thresholds may also be used without departing from the scope of the invention such that the first threshold voltage from CCM to $DCM_{HIGH}$ is less than the second threshold voltage from $DCM_{HIGH}$ to the $DCM_{NORMAL}$. The rate of rise of output voltage $V_{OUT}$ is such that (rise rate in CCM)>(rise rate in $DCM_{HIGH}$), and (rise rate in $DCM_{HIGH}$)>(rise rate in $DCM_{NORMAL}$) (for a given capacitor value of capacitor 105).

An advantage of switching between CCM, $DCM_{HIGH}$, and $DCM_{NORMAL}$ during startup of switching power converter 100 is that the startup process provides for rapid rise of $V_{OUT}$ while still limiting overshoot and ringing. When it is known that $V_{OUT}$ will be substantially below $V_{REG}$ (e.g., at initial startup), the accuracy of $V_{SENSE}$ is less critical and CCM operation may be used to cause $V_{OUT}$ to rise as rapidly as possible. By switching to open loop discontinuous conduction mode after the output voltage reaches the first threshold voltage, the switch controller 101 can begin accurately monitoring $V_{OUT}$ while still allowing $V_{OUT}$ to increase as rapidly as possible in discontinuous conduction operation. Finally, by switching to closed loop discontinuous conduction mode after $V_{OUT}$ reaches the second threshold voltage, the switching power converter can slow the rise of $V_{OUT}$ as it nears $V_{REG}$ in order to minimize overshoot and ringing.

Figure 3A:
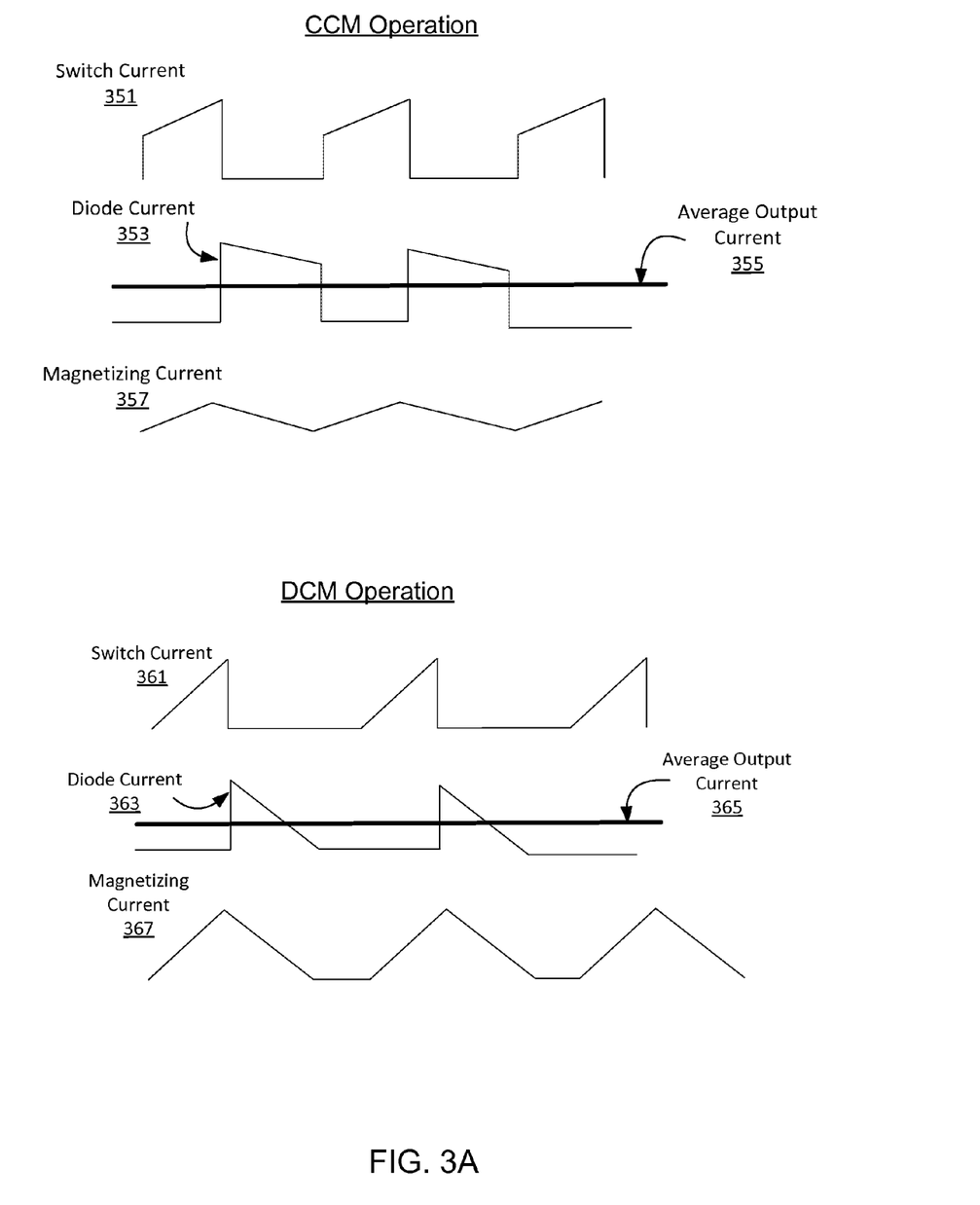
FIG. 3A illustrates current waveforms of the switching power converter comparing CCM operation to DCM operation according to one embodiment of the present invention.

FIG. 3A illustrates various current waveforms comparing CCM operation to DCM operation. In CCM, Q4 starts conducting current (as seen in waveform 351) when switch Q4 turns on without waiting for diode current 353 to drop to zero during the off-times. Average output current 355 represents the filtered low-frequency component of diode current 353. The magnetizing current 357 in transformer T1 never goes to zero in CCM because switch Q4 turns back on before this happens. In DCM, Q4 does not turn on and does not start conducting current 361 until diode current 363 drops to zero during the off-times. As a result, average output current 365 is lower in DCM than in CCM. Furthermore, magnetizing current 367 drops to zero during the off-states of Q4 before Q4 turns back on.

Figure 3B:
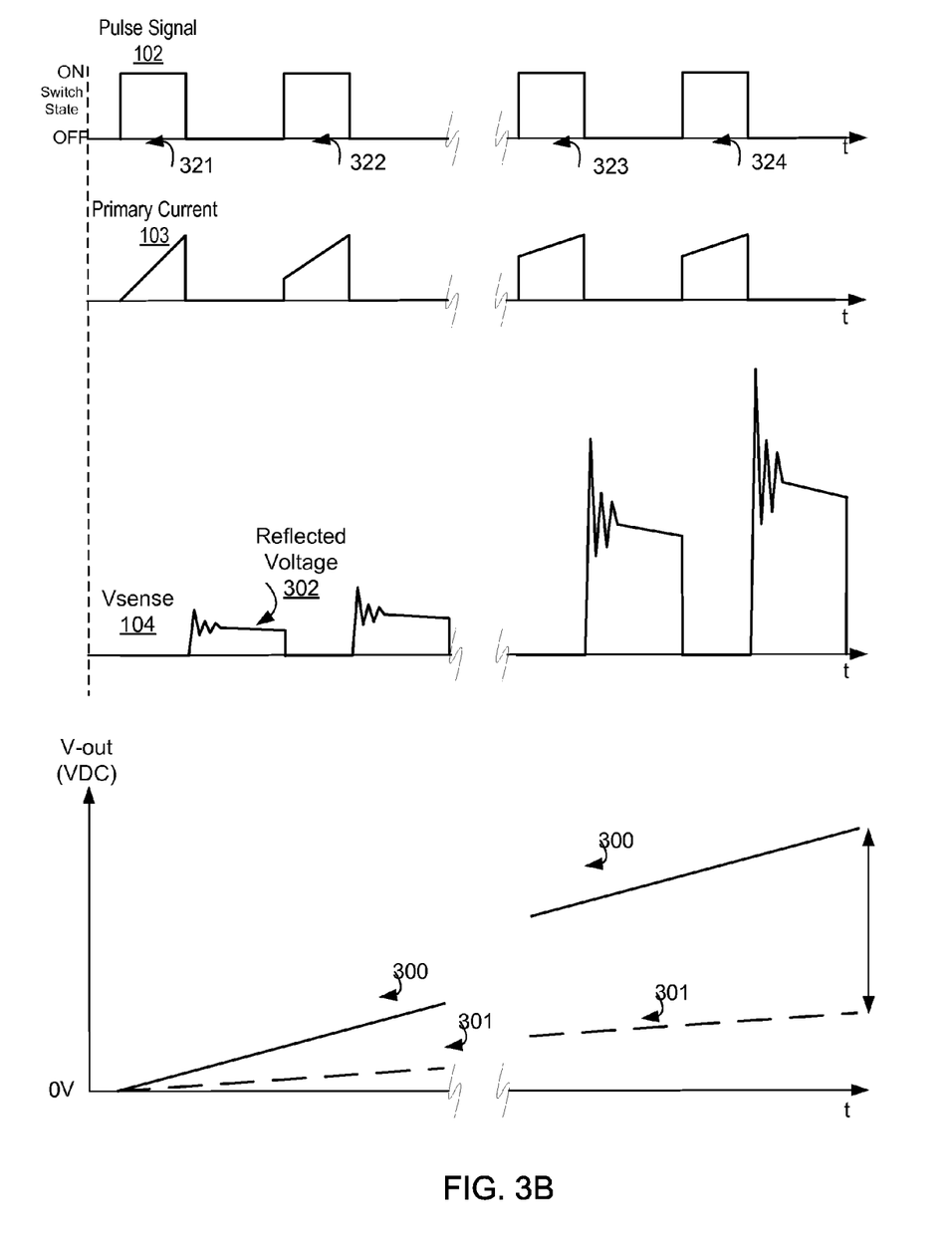
FIG. 3B illustrates voltage and current waveforms of the switching power converter in CCM according to one embodiment of the present invention.

FIG. 3B illustrates a waveform of pulse signal 102, a waveform 103 of primary current $I_P$, a waveform 104 of sensed voltage $V_{SENSE}$, and a waveform 300 of output voltage $V_{OUT}$ when the controller operates in CCM during a normal start-up sequence. When output voltage $V_{OUT}$ is far below regulation set voltage $V_{REG}$ (e.g., when $V_{SENSE}$ is below the first threshold voltage), it is more desirable to increase the output voltage level from zero volts (or near zero) rapidly. As such, during the initial startup stage when $V_{SENSE}$ is below the first threshold voltage, switch controller 101 operates switching power converter 100 in CCM to maximize the amount of energy that is transferred from the primary to the secondary output and achieve the greatest rise time of $V_{OUT}$.

During the initial pulse 321 of pulse signal 102, primary current $I_P$ 103 ramps up from zero until pulse signal 102 turns off switch Q4. When pulse signal 102 turns off switch Q4, a voltage appears on auxiliary winding Na as representing energy transferred to secondary winding Ns. Thus, a voltage is seen in Vsense 104 during the off period of switch Q4. This voltage drops back to nearly zero when pulse signal 102 turns switch Q4 back on in the second pulse 322 of pulse signal 102. During subsequent pulses 322, 323, 324 of pulse signal 102, primary current $I_P$ has a higher average value because switch Q4 is turned back on before all of the energy is transferred from primary winding Np to secondary winding Ns. Furthermore, $V_{SENSE}$ increases following each subsequent pulse 322, 323, 324 of pulse signal 102 reflecting the rise in $V_{OUT}$. The reflected voltage 302 at the point where $V_{SENSE}$ has substantially stabilized can be used to determine the general level of $V_{OUT}$, although this measurement is not as precise as using the knee voltage in DCM described below. Output voltage waveform 300 illustrates the rise of $V_{OUT}$ corresponding to CCM operation. Alternatively, for comparison, dashed output voltage waveform 301 illustrates the rise of $V_{OUT}$ if switching power converter 100 was operating in DCM. As can be seen, $V_{OUT}$ rises more quickly in CCM than in DCM.

In order to further maximize the rise time of the output voltage during CCM, the primary peak current setting can be set at maximum with a given necessary operating frequency, maximizing the energy delivered to the secondary output. There are various ways to implement this, including, for example, the techniques described in U.S. Patent Application Publication No. 2010/0157636 entitled "Controller for Switching Power Converter Driving BJT Based on Primary Side Adaptive Digital Control," to Li, et al. the content of which is incorporated by reference herein in its entirety.

Figure 4:
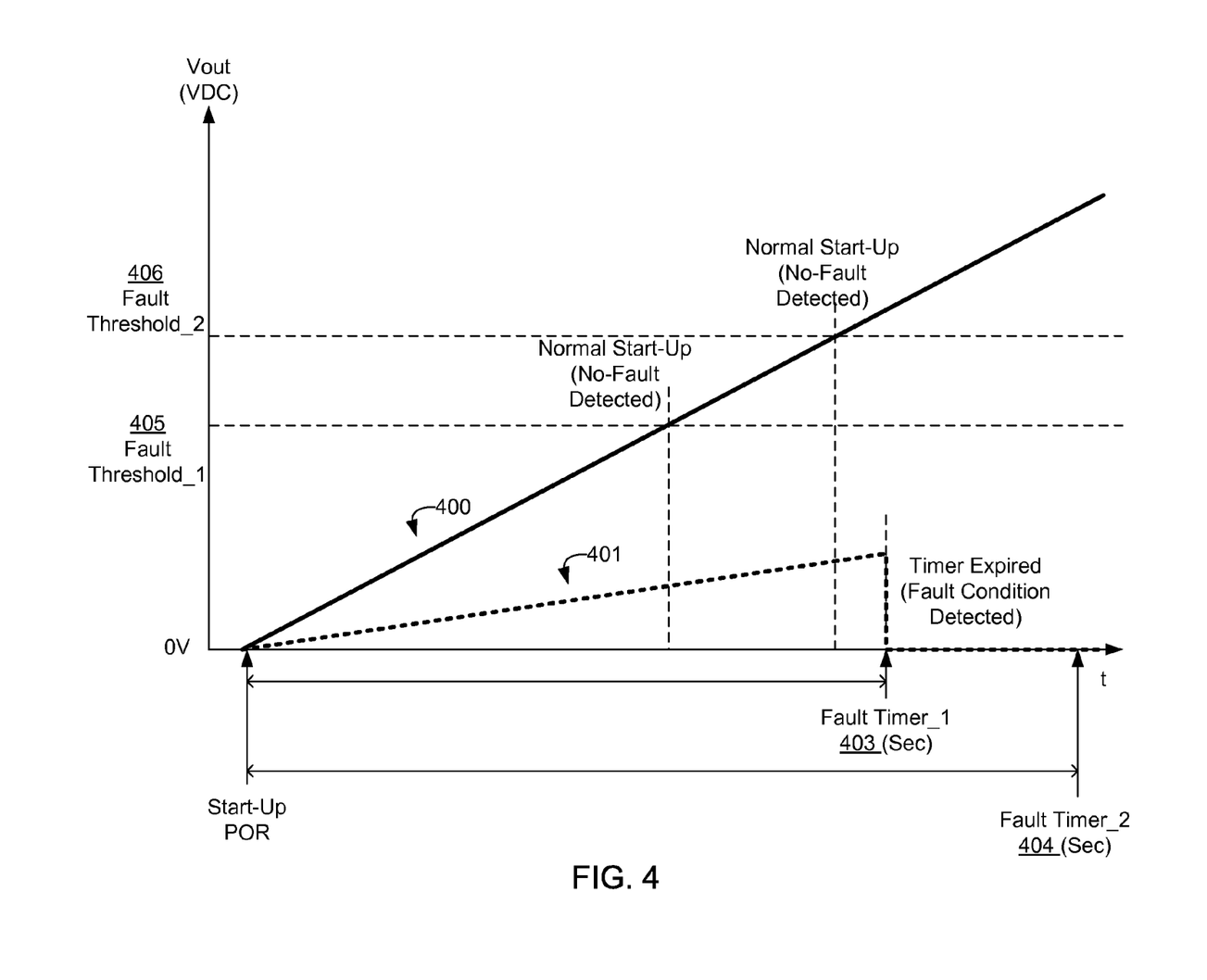
FIG. 4 illustrates the waveforms of CCM during a normal start-up sequence and when a fault condition is detected according to one embodiment of the present invention.

A potential problem with the initial startup stage in CCM is that controller 101 may be susceptible to false detections of a fault condition because in both scenarios, sensed output voltage $V_{OUT}$ is substantially lower than regulated voltage $V_{REG}$. This problem can be remedied using threshold timers as illustrated in FIG. 4. FIG. 4 illustrates $V_{OUT}$ during a normal start-up sequence and when a fault condition is detected. At the start-up state, the controller 101 activates a timer (e.g., a software or hardware timer internal to the controller 101). If sensed output voltage $V_{SENSE}$ indicates that $V_{OUT}$ does not reach a voltage threshold within a given time, a fault condition is detected and switching power converter 100 is placed into a safe operating mode. Output voltage 400 illustrates the output voltage rise under a normal start up sequence. Under the normal start up condition, output voltage 400 reaches Fault Threshold_1 405 prior to the expiration of Fault Timer_1 403 and no fault condition is detected. There may be multiple fault timers and thresholds such as, for example, Fault Timer_2 404 and Fault Threshold_2 406. Conversely, output voltage 401 illustrates the output voltage rise under a fault condition. Under the fault condition, output voltage 401 fails to reach Fault Threshold_1 405 prior to the expiration of Fault Timer_1 403. Switching power converter 100 may be placed in a variety of safe operating modes in response to detection of the fault condition. The fault condition voltage levels Fault Threshold_1 405 and Fault_Threshold_2 406 can be based on a percentage of the desired regulation voltage $V_{REG}$.

Figure 5:
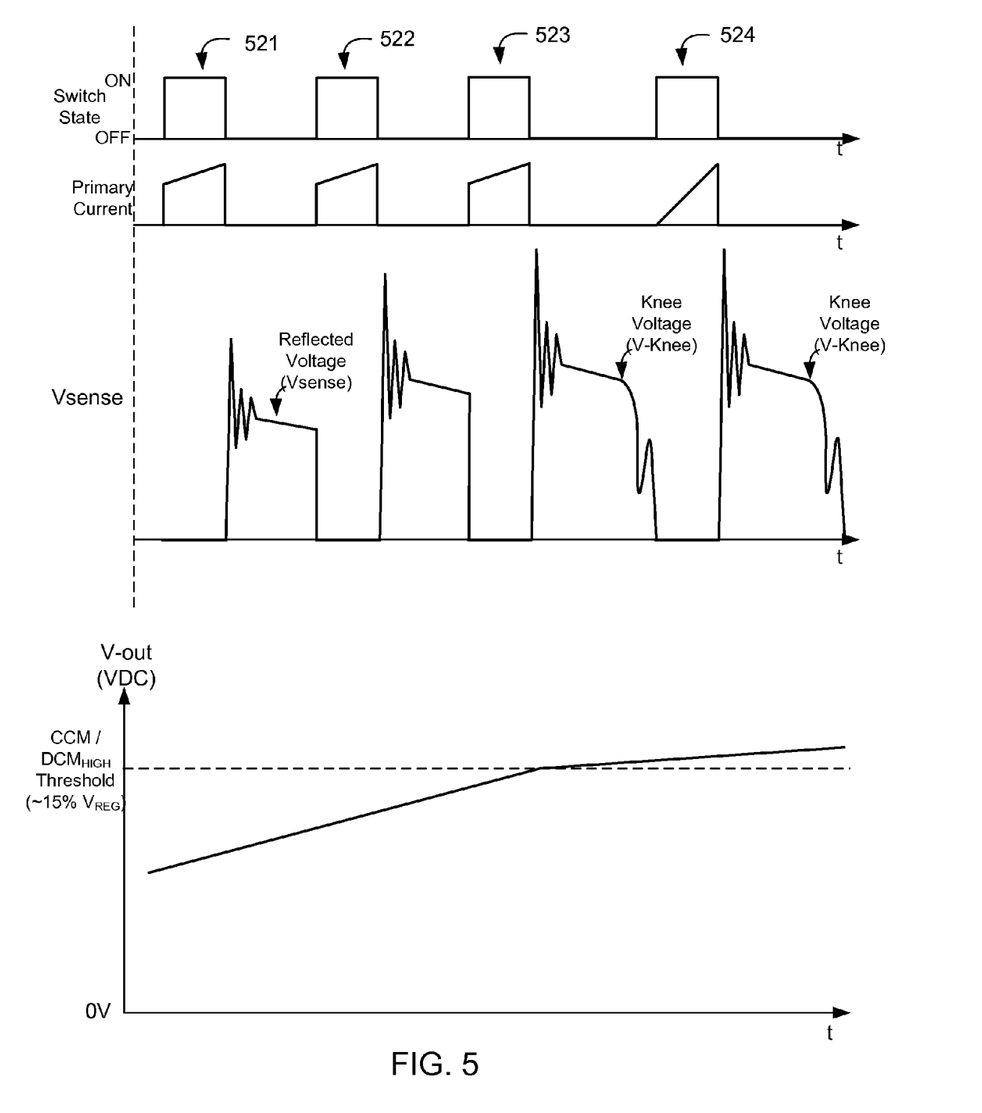
FIG. 5 illustrates the waveforms of the transition from CCM to $DCM_{HIGH}$ of the switching power converter according to one embodiment of the present invention.

FIG. 5 illustrates the waveforms of the transition from CCM to $DCM_{HIGH}$. During pulses 521, 522, 523, the switching power converter 100 operates in CCM. In CCM, switch Q4 turns on (in pulses 521, 522, 523) prior to the all of the energy in transformer T1 being delivered to the output (diode D1 current does not go to zero). Thus, output current $I_{OUT}$ is higher on average than in DCM and $V_{OUT}$ rises rapidly. Furthermore $V_{SENSE}$ increases following each pulse 521, 522, 523. Sensed voltage $V_{SENSE}$ represents a reflected voltage of $V_{OUT}$, but this reflected voltage does not provide a precise representation of $V_{OUT}$. Nevertheless, the reflected voltage provides a general idea of $V_{OUT}$ and is sufficient for comparing to the first threshold voltage and determining when to transition to $DCM_{HIGH}$. Once $V_{OUT}$ has risen above the first threshold voltage (as reflected by $V_{SENSE}$), and there are no fault conditions detected, switch controller 101 transitions switching power converter 100 from CCM to $DCM_{HIGH}$. In the illustrated example, this transition occurs between pulse 523 and pulse 524. In $DCM_{HIGH}$, knee voltage V-knee can be used to derive an accurate reading of $V_{OUT}$. The knee voltage is the point in the switching cycle in which the energy in transformer T1 has been fully delivered to the output as the diode D1 current drops to zero, and can be seen in $V_{SENSE}$ as the point connecting two substantially linear portions of the waveform. As can be seen, the knee voltage is not available in CCM because pulses 522, 523 cause $V_{SENSE}$ to drop to zero prior to the knee voltage conditions occurring, i.e., switch Q4 turns on before all of the energy in transformer winding Ns has been fully delivered to the output. Once in DCM following pulse 523, controller 101 can continue monitoring $V_{SENSE}$. Specifically, controller 101 detects when the knee voltage of $V_{SENSE}$ rises above the second threshold voltage. At this point, switch controller 101 will transition switching power converter 100 from $DCM_{HIGH}$ to the $DCM_{NORMAL}$ (not shown in FIG. 5).

An embodiment of the present invention comprises a switching power converter providing adaptive primary-only control of switching cycles. At start-up conditions, when the output voltage is significantly lower than the desired regulation point, the primary-only control provides for the orderly rise (minimal overshoot and ringing) of the output voltage level while maintaining protection for fault conditions and avoiding false fault conditions. The adaptive control allows for the proper start-up procedure over a wide range of output capacitance that is coupled to the secondary output.

Thus, controller 101 beneficially switches between various modes of operation during start-up in order to cause $V_{OUT}$ to rise rapidly to the regulated level while minimizing overshoot and ringing. Furthermore, controller 101 maintains protection for fault conditions, thus providing for more robust operation of switching converter 100.

Upon reading this disclosure, those of skill in the art will appreciate still additional alternative designs for a switching power converter and method for controlling a switching power converter. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention.

The invention claimed is:
1. A switching power converter comprising:
a transformer including a primary winding coupled to an input voltage and a secondary winding coupled to an output of the switching power converter;
a switch coupled to the primary winding of the transformer, current through the primary winding being generated while the switch is turned on and not being generated while the switch is turned off; and
a switch controller configured to generate a control signal to turn on or turn off the switch, the switch being turned on responsive to the control signal being in a first state and the switch being turned off responsive to the control signal being in a second state, the switch controller monitoring a sensed voltage representing an output voltage of the switching power converter, and the switch controller configured to control switching of the switch to operate the switching power converter in a continuous conduction mode while the sensed voltage indicates that the output voltage is less than a first threshold voltage, the switch controller further configured to control switching of the switch to operate the switching power converter in an open loop discontinuous conduction mode while the sensed voltage indicates that the output voltage is above the first threshold voltage and below a second threshold voltage, wherein the switching controller controls switching of the switch independently of the sensed voltage when in the open loop discontinuous conduction mode, and the switch controller configured to control switching of the switch to operate the switching power converter in a closed loop discontinuous conduction mode while the sensed voltage indicates that the output voltage is above the second threshold voltage, wherein the first threshold voltage and the second threshold voltage are less than a desired regulation voltage of the switching power converter.

2. The switching power converter of claim 1, wherein the switching controller controls switching of the switch in the continuous conduction mode such that a transformer magnetizing current remains above zero.

3. The switching power converter of claim 1, wherein the switching controller controls switching of the switch in the open loop discontinuous conduction mode and the closed loop discontinuous conduction mode such that a transformer magnetizing current drops to zero before the switch is turned on in each switching cycle of the switch.

4. The switching power converter of claim 1, wherein the switching controller controls switching of the switch in the open loop discontinuous conduction mode such that a switching frequency and peak primary side current are maintained at predefined levels regardless of the sensed voltage.

5. The switching power converter of claim 1, wherein the switch controller controls switching of the switch in the closed loop discontinuous conduction mode such that the output voltage is maintained within an allowable error range of the desired regulation voltage.

6. The switching power converter of claim 1, wherein the second threshold voltage comprises a predefined percentage of a desired regulation voltage, wherein the predefined percentage is in a range of 60%-80%.

7. The switching power converter of claim 1, wherein the first threshold voltage comprises a predefined percentage of a desired regulation voltage, wherein the predefined percentage is in a range of 10%-25%.

8. The switch power converter of claim 1, wherein the switch controller is further configured to activate a timer upon start up of the switching power converter, and wherein the switch controller is configured to detect a fault condition if the sensed voltage indicates that the output voltage fails to rise above a first fault detection voltage prior to the timer reaching a first fault detection time.

9. The switching power converter of claim 8, wherein the switch controller is further configured to detect the fault condition if the sensed voltage indicates that the output voltage fails to rise above a second fault detection voltage prior to the timer reaching a second fault detection time, wherein the second fault detection voltage is greater than the first fault detection voltage, and wherein the second fault detection time is greater than the first fault detection time.

10. In a controller, a method of controlling a switching power converter, the switching power converter including a transformer with a primary winding coupled to an input voltage and a secondary winding coupled to an output of the switching power converter, and a switch coupled to the primary winding of the transformer, current through the primary winding being generated while the switch is turned on and not being generated while the switch is turned off, the method comprising:

generating a pulse signal for turning the switch on and off;

monitoring a sensed voltage representing an output voltage of the switching power converter;

controlling switching of the switch to operate the switching power converter in a continuous conduction mode while the sensed voltage indicates that the output voltage is less than a first threshold voltage;

controlling switching of the switch to operate the switch controller in an open loop discontinuous conduction mode while the sensed voltage indicates that the output voltage is above the first threshold voltage and below a second threshold voltage, wherein the switching controller controls switching of the switch independently of the sensed voltage when in the open loop discontinuous conduction mode, and wherein the first threshold voltage and the second threshold voltage are less than a desired regulation voltage of the switching power converter; and controlling switching of the switch to operate the switching power converter in a closed loop discontinuous conduction mode while the sensed voltage indicates that the output voltage is above the second threshold voltage.

11. The method of claim 10, wherein controlling switching in the continuous conduction mode comprises:

controlling switching of the switch such that a transformer magnetizing current remains above zero.

12. The method of claim 10, wherein controlling switching in the open loop discontinuous conduction mode and the closed loop discontinuous conduction mode comprises:

controlling switching of the switch such that a transformer magnetizing current drops to zero before the switch is turned on in each switching cycle of the switch.

13. The method of claim 10, wherein controlling switching in the open loop discontinuous conduction mode comprises:

controlling switching of the switch such that a switching frequency and peak primary side current are maintained at predefined levels regardless of the sensed voltage.

14. The method of claim 10, wherein controlling switching in the closed loop discontinuous conduction mode comprises:

controlling switching of the switch such that the output voltage is maintained within an allowable error range of the desired regulation voltage.

15. The method of claim 10, wherein the second threshold voltage comprises a predefined percentage of a desired regulation voltage, wherein the predefined percentage is in a range of 60%-80%.

16. The method of claim 10, wherein the first threshold voltage comprises a predefined percentage of a desired regulation voltage, wherein the predefined percentage is in a range of 10%-25%.

17. The method of claim 10, further comprising:

activating a timer upon start up of the switching power converter; and detecting a fault condition if the sensed voltage indicates that the output voltage fails to rise above a first fault detection voltage prior to the timer reaching a first fault detection time.

18. The method of claim 17, further comprising:

detecting the fault condition if the sensed voltage indicates that the output voltage fails to rise above a second fault detection voltage prior to the timer reaching a second fault detection time, wherein the second fault detection voltage is greater than the first fault detection voltage, and wherein the second fault detection time is greater than the first fault detection time.

* * * * *